(12) United States Patent
Shimada

(10) Patent No.: US 10,699,859 B2
(45) Date of Patent: Jun. 30, 2020

(54) MULTIPLE CONTACT LINEAR SLIDE SWITCH

(71) Applicant: Valeo Japan Co., Ltd., Saitama (JP)

(72) Inventor: Hiroyuki Shimada, Tokyo (JP)

(73) Assignee: Valeo Japan Co., Ltd. (JP)

( * ) Notice: Subject to any disclaimer, the term of this patent is extended or adjusted under 35 U.S.C. 154(b) by 0 days.

(21) Appl. No.: 16/218,466

(22) Filed: Dec. 12, 2018

(65) Prior Publication Data

US 2019/0180958 A1   Jun. 13, 2019

(30) Foreign Application Priority Data

Dec. 13, 2017   (JP) ................................. 2017-238221

(51) Int. Cl.
| | |
|---|---|
| *H01H 15/00* | (2006.01) |
| *H01H 15/06* | (2006.01) |
| *H01H 1/36* | (2006.01) |
| *H01H 1/58* | (2006.01) |
| *F16H 59/10* | (2006.01) |

(Continued)

(52) U.S. Cl.
CPC ........... *H01H 15/06* (2013.01); *F16H 59/105* (2013.01); *H01H 1/36* (2013.01); *H01H 1/403* (2013.01); *H01H 1/5805* (2013.01); *H01H 15/005* (2013.01); *H01H 15/24* (2013.01); *H01H 2300/02* (2013.01); *H01H 2300/052* (2013.01)

(58) Field of Classification Search
CPC ...... H01H 15/00; H01H 15/02; H01H 15/005; H01H 15/22; H01H 15/24; H01H 2300/02; H01H 19/54
See application file for complete search history.

(56) References Cited

U.S. PATENT DOCUMENTS

| | | | | |
|---|---|---|---|---|
| 4,152,565 A | * | 5/1979 | Rose .................... | H01H 15/005 200/16 A |
| 4,332,987 A | * | 6/1982 | Hoffman .............. | H01H 15/005 200/16 D |

(Continued)

FOREIGN PATENT DOCUMENTS

| | | |
|---|---|---|
| EP | 0845620 A2 | 6/1998 |
| JP | 2004-119244 A | 4/2004 |
| KR | 20030026138 A | 3/2003 |

OTHER PUBLICATIONS

European search report dated Apr. 26, 2019.

(Continued)

*Primary Examiner* — Vanessa Girardi
(74) *Attorney, Agent, or Firm* — Fishman Stewart PLLC

(57) ABSTRACT

A switch may include a movable board and a pole board having an inner surface on which a fixed contact point is exposed, the inner surface facing the movable board. A movable contact point may be supported by the movable board and may include a plurality of contact pieces making resilient contact with the inner surface of the pole board. The switch may also include an output terminal corresponding to the fixed contact point. The movable contact point and the fixed contact point may come in contact with each other when a position of the movable contact point is changed via a displacement of the movable board. The fixed contact point and the output terminal may be connected via a board having a disconnection detection circuit. The board may be enclosed in an insulating seal material.

20 Claims, 6 Drawing Sheets

(51) Int. Cl.
    *H01H 15/24*     (2006.01)
    *H01H 1/40*      (2006.01)

(56)         References Cited

U.S. PATENT DOCUMENTS

| 4,857,678 | A | * | 8/1989 | Lipp | H01H 15/02 |
| | | | | | 200/16 R |
| 4,904,828 | A | * | 2/1990 | Lipp | H01H 15/02 |
| | | | | | 200/16 B |
| 5,525,768 | A | * | 6/1996 | Cobb | F16H 59/105 |
| | | | | | 200/11 G |
| 5,561,416 | A | | 10/1996 | Marshall et al. | |
| 5,860,515 | A | * | 1/1999 | Tomotoshi | F16H 59/105 |
| | | | | | 200/550 |
| 5,969,313 | A | * | 10/1999 | Ikeshima | H01H 21/34 |
| | | | | | 200/61.88 |
| 6,518,525 | B1 | * | 2/2003 | Anastasia | F16H 59/105 |
| | | | | | 200/550 |
| 6,872,906 | B2 | | 3/2005 | Nakazawa et al. | |
| 7,075,022 | B1 | * | 7/2006 | Silveria | F16H 59/105 |
| | | | | | 200/61.88 |
| 7,956,298 | B2 | * | 6/2011 | Shimada | F16H 59/105 |
| | | | | | 200/11 A |
| 10,002,730 | B2 | * | 6/2018 | Shimada | H01H 19/03 |
| 2004/0074749 | A1 | | 4/2004 | Nakazawa et al. | |
| 2009/0133995 | A1 | * | 5/2009 | Nakano | F16H 59/105 |
| | | | | | 200/61.91 |

OTHER PUBLICATIONS

English abstract for KR-20030026138.
Database WPI, Week 200349 Thomson Scientific, London, GB; AN 2003-520969 XP002790869.

* cited by examiner

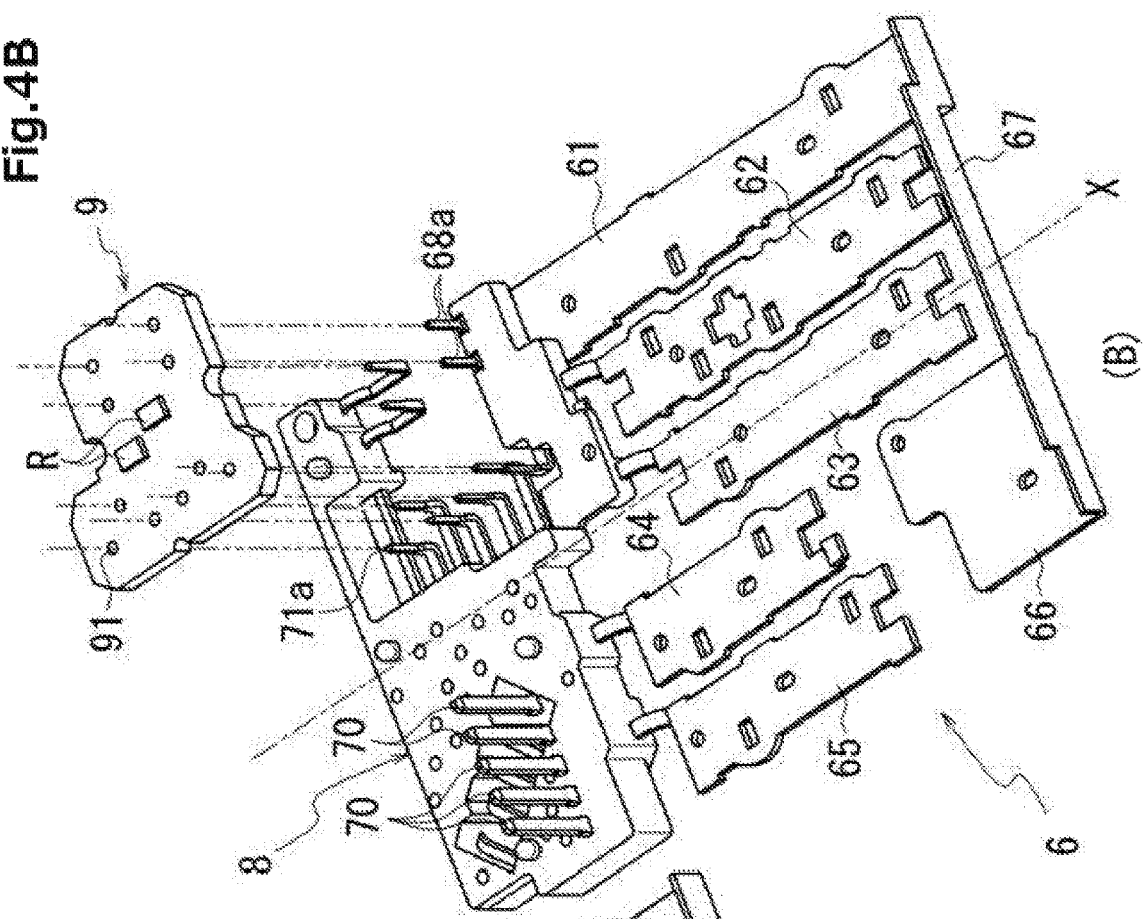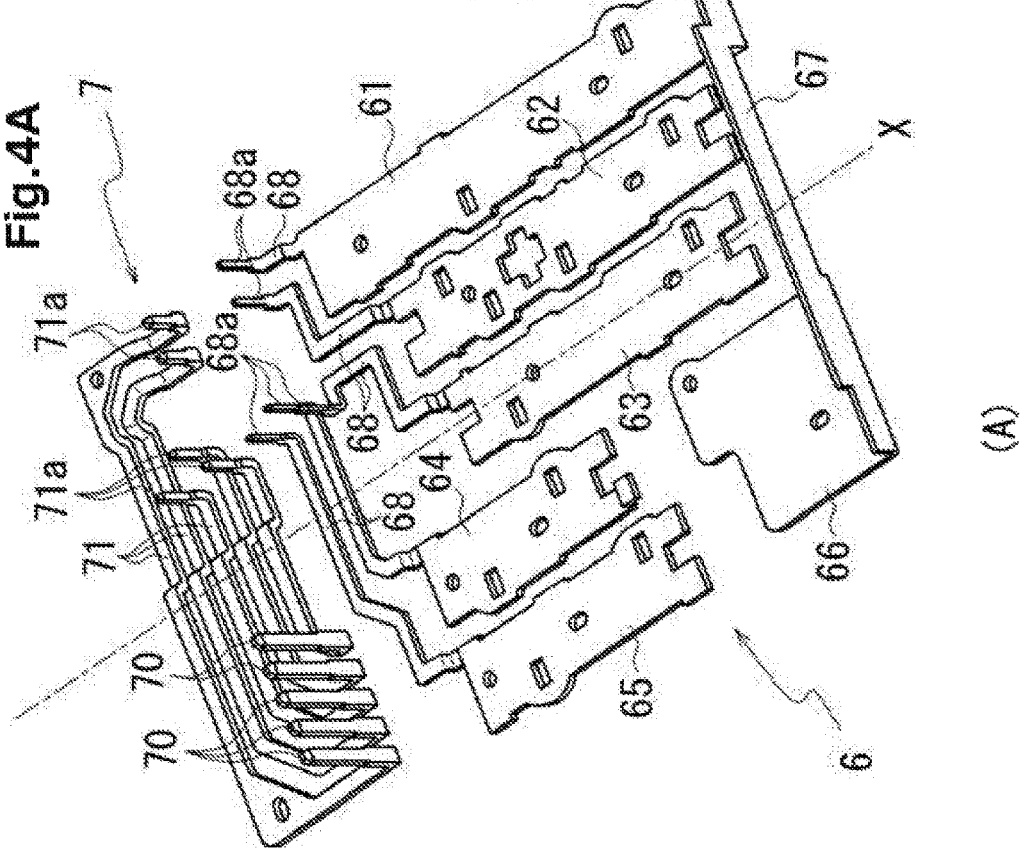

MULTIPLE CONTACT LINEAR SLIDE SWITCH

CROSS-REFERENCE TO RELATED APPLICATION

This application claims priority under 35 USC 119 from Japanese Patent Application No. JP 2017-238221 filed on Dec. 13, 2017, the disclosure of which is incorporated by reference herein.

TECHNICAL FIELD

The present invention relates to a switch.

BACKGROUND

Japanese Patent Laid-Open No. 2004-119244 discloses an inhibitor switch that is disposed on a vehicular automatic transmission and is used for detection of a selection range of a shift lever.

The inhibitor switch disclosed in Japanese Patent Laid-Open No. 2004-119244 is provided with a movable board that moves back and forth in an axis line direction in association with an operation of the shift lever, a pole board on a surface of which a fixed contact point is exposed, the surface facing the movable board, and a movable contact point that is disposed on the facing surface of the movable board to the pole board.

In the pole board, the fixed contact point comprises a plurality of fixed contact points that are disposed to be spaced in a direction perpendicular to the axis line direction. The movable contact point has contact pieces the number of which is the same as the number of the fixed contact points, and each of the contact pieces resiliently makes pressure-contact with the surface of the pole board in a facing direction of the movable board and the pole board.

In the inhibitor switch, a combination of the movable contact point and the fixed contact point to come in contact with each other through the movable contact point changes with a position of the movable board in the axis line direction.

The inhibitor switch outputs a signal that differs depending upon the combination of the movable contact point and the fixed contact point to come in contact with each other through the movable contact point.

The inhibitor switch is provided with a connector terminal, and a harness extending from a side of an unillustrated control device is connected to the connector terminal.

In the control device, the selection range of the shift lever is specified based upon a signal that is input from a side of the inhibitor switch.

SUMMARY

The control device determines presence/absence of abnormality of the inhibitor switch based upon a signal that is input from the side of the inhibitor switch.

However, in a case of the above-mentioned inhibitor switch, not only in a case where a failure occurs in the inhibitor switch, but also in a case where a failure of disconnection or the like occurs in the harness, the presence of the abnormality is determined.

That is, the occurrence of the abnormality due to the failure in the inhibitor switch and the occurrence of the abnormality due to the failure in the harness cannot be distinguished.

Therefore it is required to be capable of detecting the failure in the inhibitor switch.

Accordingly, the present invention is made in view of the above-described problem, and an object of the present invention is to provide a switch which can detect a failure in the switch itself.

According to an aspect of the present invention, a switch comprises:
a movable board;
a pole board on an inner surface of which a fixed contact point is exposed, the inner surface facing the movable board;
a movable contact point that is supported by the movable board and includes contact pieces making resilient contact with the inner surface of the pole board; and
an output terminal corresponding to the fixed contact points, a combination of the fixed contact point to come in contact with each other through the movable contact point being changed by displacement of the movable board, wherein
the fixed contact point and the output terminal are connected through a board having a disconnection detection circuit, and
the board is enclosed in an insulating seal material.

According to the aspect of the present invention, the presence/absence of the abnormality in the switch can be directly confirmed from the output signal of the switch.

BRIEF DESCRIPTION OF THE DRAWINGS

Other objects, features, and advantages of the present invention will become more apparent from the following detailed description made with reference to the accompanying drawings, in which like parts are designated by like reference numbers and in which:

FIG. 4A is an exploded perspective view illustrating elements of the pole board according to the embodiment;

FIG. 4B is an exploded perspective view illustrating the elements of the pole board according to the embodiment;

DETAILED DESCRIPTION

Hereinafter, a switch according to an embodiment in the present invention will be explained by taking an inhibitor switch 1 to be attached on a vehicular automatic transmission, as an example thereof.

Figure 1:
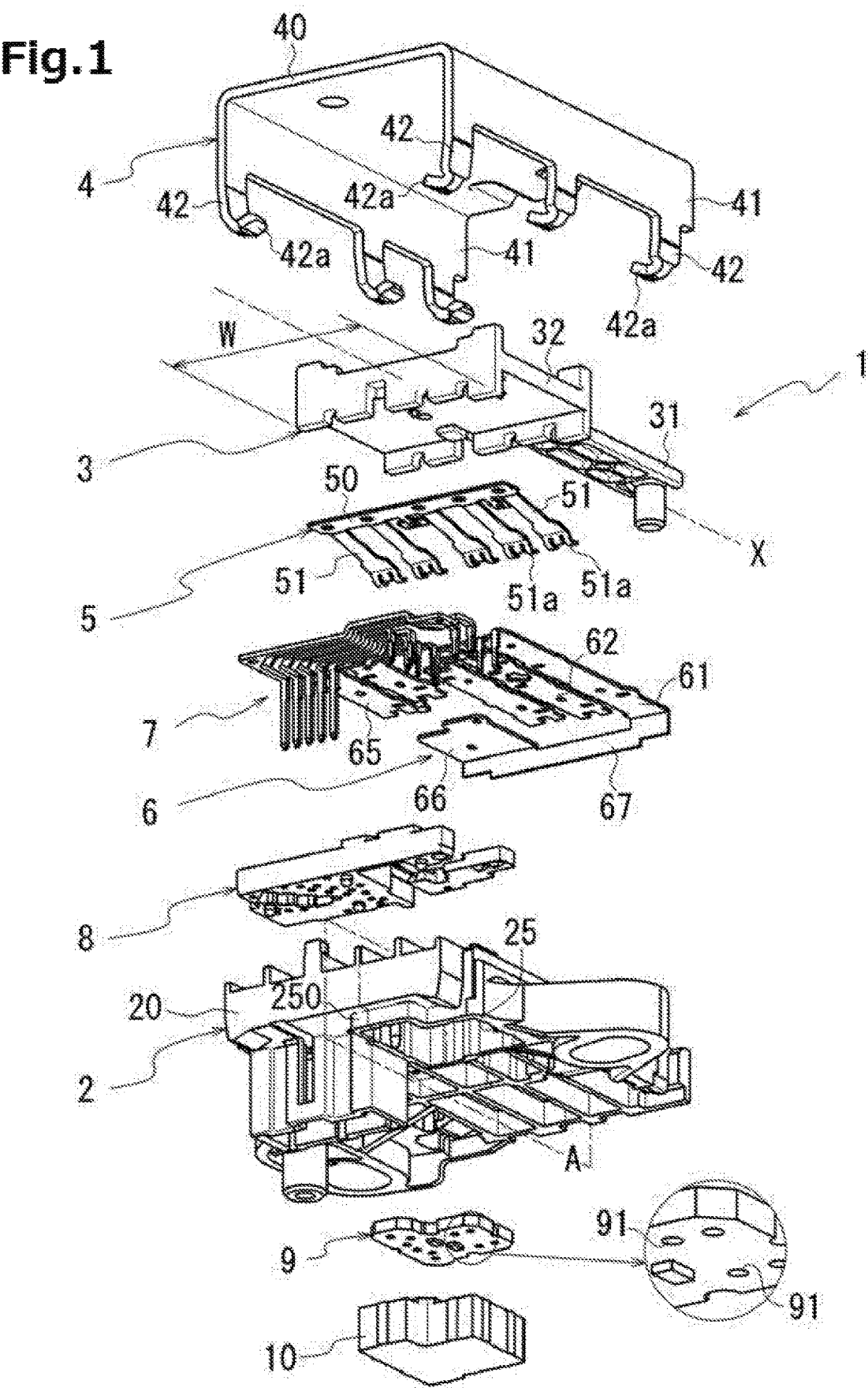
FIG. 1 is an exploded perspective view illustrating an inhibitor switch according to an embodiment in the present invention.

FIG. 1 is an exploded perspective view explaining the configuration of the inhibitor switch 1.

Figure 2:
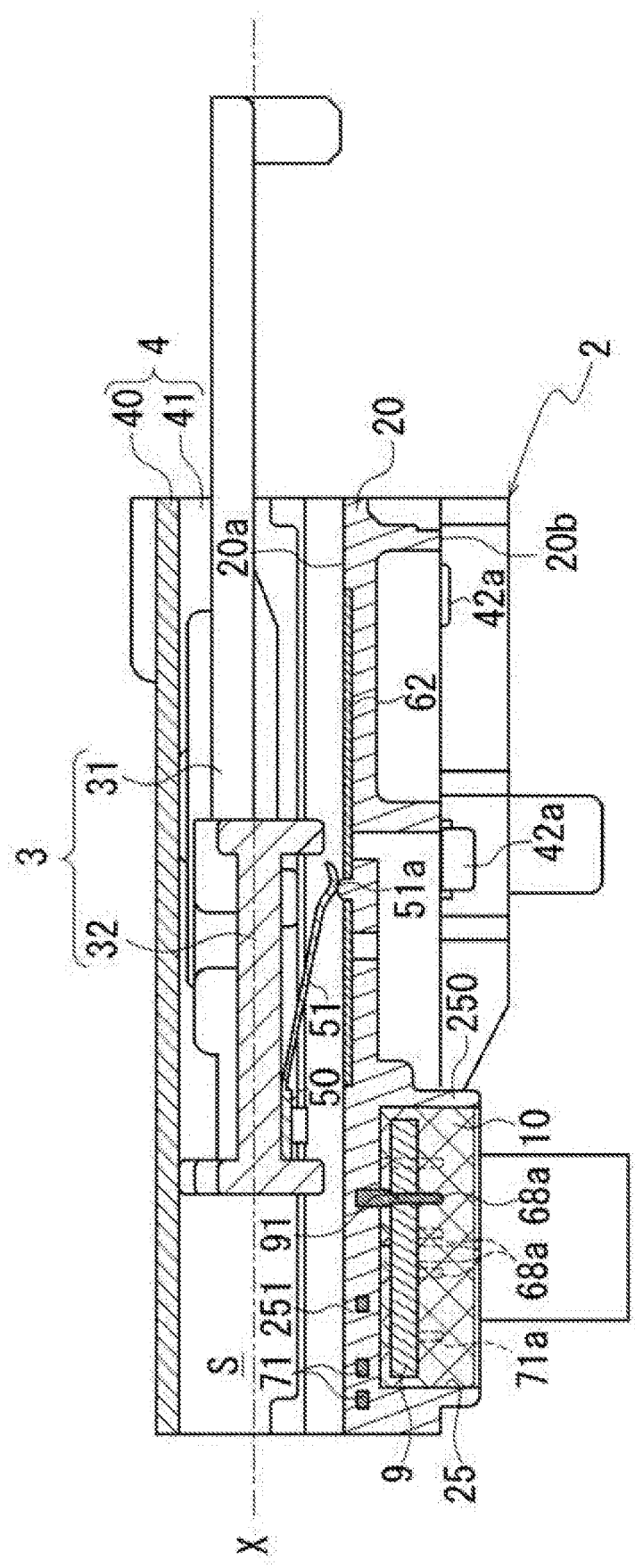
FIG. 2 is a cross section illustrating the inhibitor switch according to the embodiment.

FIG. 2 is a cross section by cutting the inhibitor switch 1 along a plane A in FIG. 1.

Figure 3A:
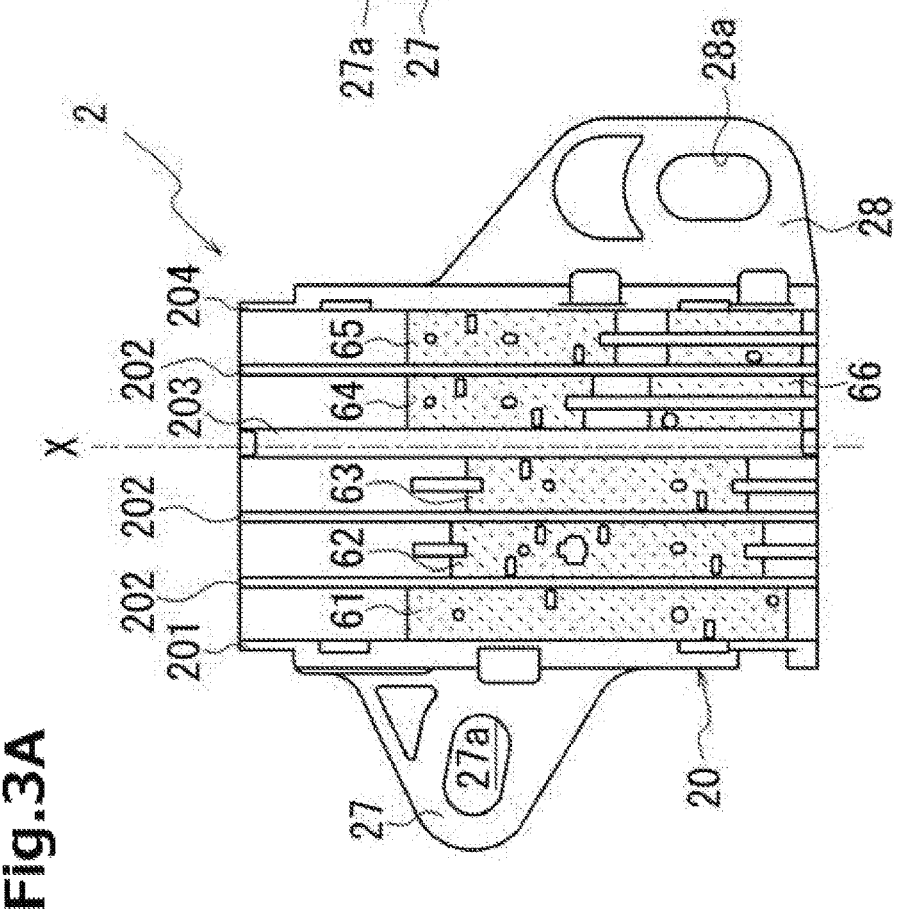
FIG. 3A is a plan view illustrating a pole board according to the embodiment.
Figure 3B:
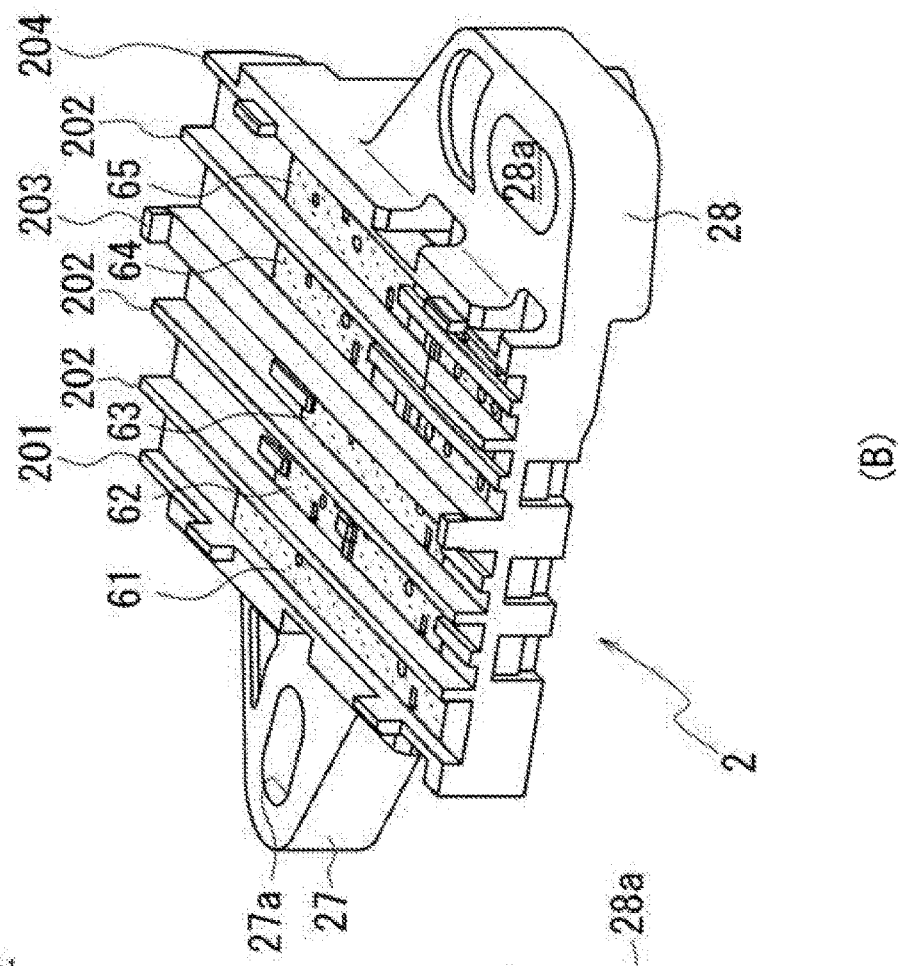
FIG. 3B is a perspective view illustrating the pole board according to the embodiment.

FIGS. 3A and 3B are diagrams explaining a pole board 2, wherein FIG. 3(A) is a plan view of the pole board 2 as viewed from a cover 4-side, and FIG. 3(B) is a perspective view of the pole board 2 as viewed from the cover 4-side.

It should be noted that in FIGS. 3A and 3B, for the descriptive purposes, a region of contact pieces 61, 62, 63, 64, 65, 66 of a fixed contact point 6 is illustrated by hatching.

The inhibitor switch 1 is installed within a case of the automatic transmission and is used for detection of a selection range of a shift lever.

As illustrated in FIG. 1 and FIG. 2, a movable board 3 is disposed between the pole board 2 and the cover 4 in the inhibitor switch 1, and the movable board 3 is disposed to be movable back and forth in an axis line X direction along a longitudinal direction of the movable board 3.

The movable board 3 is displaced in the axis line X direction in association with a change in a selection range of the shift lever (unillustrated).

The movable board 3 has a shaft part 31 along the axis line X direction and a contact point support part 32 disposed on one end of the shaft part 31.

As illustrated in FIG. 1, the contact point support part 32 is disposed in a direction perpendicular to the axis line X, and has a predetermined width W in the direction perpendicular to the axis line X.

A movable contact point 5 is attached on a facing surface of the contact point support part 32 to the pole board 2.

The movable contact point 5 has a plurality of contact pieces 51 lining up by intervals in the direction perpendicular to the axis line X, and a base end of each of the contact pieces 51 is connected to a band-shaped base part 50.

Each of the contact pieces 51 is supported in a cantilever manner by the base part 50, and a sliding part 51a-side at a tip end side of the contact piece 51 is resiliently displaceable in an assembling direction (upper-lower direction in the figure) of the pole board 2 and the cover 4.

In the inhibitor switch 1, each of the contact pieces 51 of the movable contact point 5 causes the sliding part 51a to make resilient contact with a surface 20a (refer FIG. 2) of the pole board 2 facing the cover 4.

It should be noted that in the following explanation, the cover 4-side will be described as "upper side" and the pole board 2-side will be described as "lower side" in FIG. 1.

The cover 4 that covers an upper surface of the movable board 3 is formed by bending one sheet of a metallic plate.

The cover 4 has a base part 40 formed in a rectangular shape as viewed from the upper side, and the base part 40 has an area with which the surface 20a (refer to FIG. 2) of the base part 20 in the pole board 2 can be covered over its entire surface.

Both sides of the base part 40 in the direction perpendicular to the axis line X are provided with side wall parts 41, 41 extending to the pole board 2-side. Each of the side wall parts 41, 41 is provided with a plurality of engaging pieces 42 to be spaced in the axis line X direction.

The cover 4 is incorporated in the pole board 2 in a state where the cover 4 is restricted from dropping out of the pole board 2 by bending a tip end part 42a of the engaging piece 42 to be engaged with the base part 20 after fitting the side wall parts 41, 41 onto an outer periphery of the base part 20 of the pole board 2.

In this state the plate-shaped base part 40 of the cover 4 is arranged by an interval to the base part 20 of the pole board 2, and a space S (refer to FIG. 2) allowing for accommodation of the movable board 3 is formed between the base part 40 and the pole board 2.

As illustrated in FIG. 3, contact pieces 61, 62, 63, 64, 65, 66 of the fixed contact point 6 are exposed on the surface 20a facing the base part 40 of the cover 4 in the base part 20 of the pole board 2.

The contact pieces 61, 62, 63, 64, 65, 66 are disposed by intervals in the direction perpendicular to the axis line X, and wall parts 201, 202, 203, 204 each are disposed between the neighboring contact pieces.

The wall parts 201, 202, 203, 204 are disposed linearly along the axis line X, and the wall parts 201, 202, 203, 204 are disposed across the base part 20 from one end to the other end in the direction of the axis line X direction.

The wall parts 201, 202, 203, 204 project closer to the upper side (nearer side of the sheet surface in FIG. 3A) at the cover 4-side than the contact pieces 61, 62, 63, 64, 65, 66, and a contact piece 51 of the movable contact point 5 is arranged between the neighboring wall parts.

Mounting parts 27, 28 having bolt holes 27a, 28a are formed in both sides of the base part 20 in the width direction (left-right direction in FIG. 3A) to extend in the direction perpendicular to the axis line X.

FIG. 4A and FIG. 4B are perspective views explaining an output terminal 7 and the fixed contact point 6, wherein FIG. 4A is a perspective view illustrating the output terminal 7 and the fixed contact point 6, as viewed from the lower side at the pole board 2-side and FIG. 4B is a perspective view illustrating a state where the output terminal 7 and the fixed contact point 6 are connected by a common resin member 8.

Figure 5:
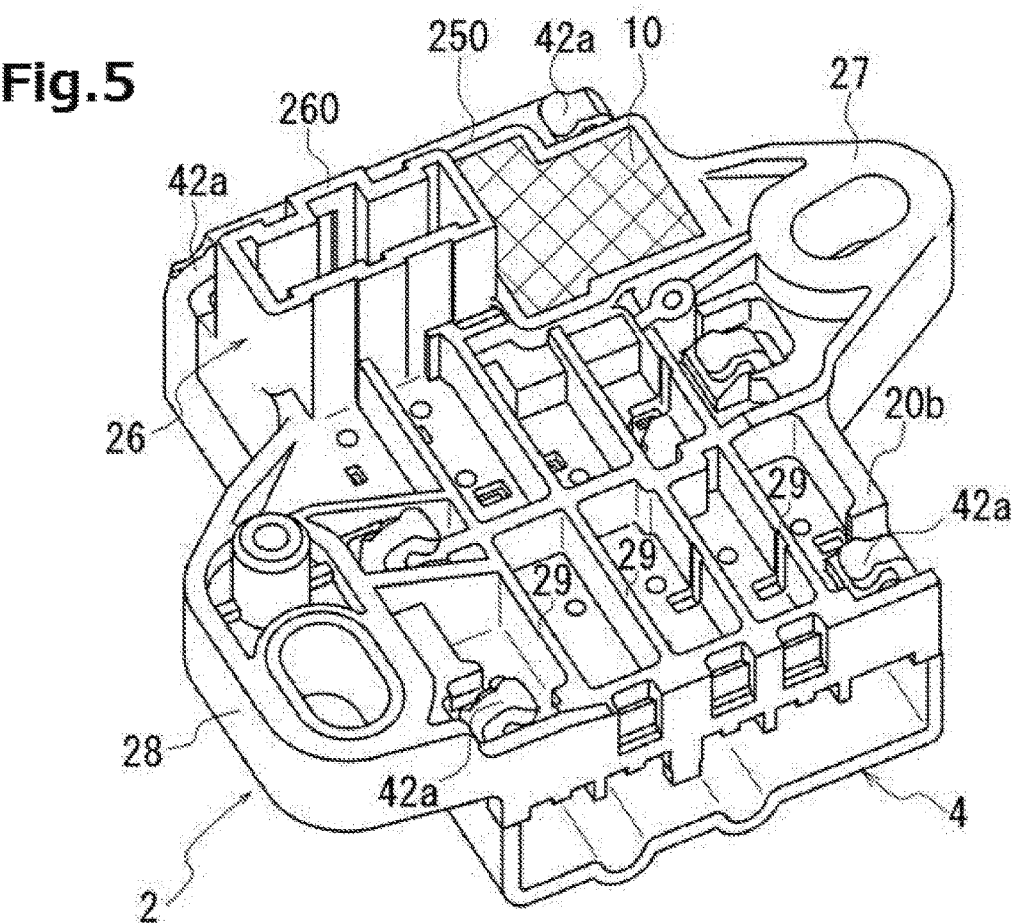
FIG. 5 is a perspective view illustrating the pole board according to the embodiment.
Figure 6:
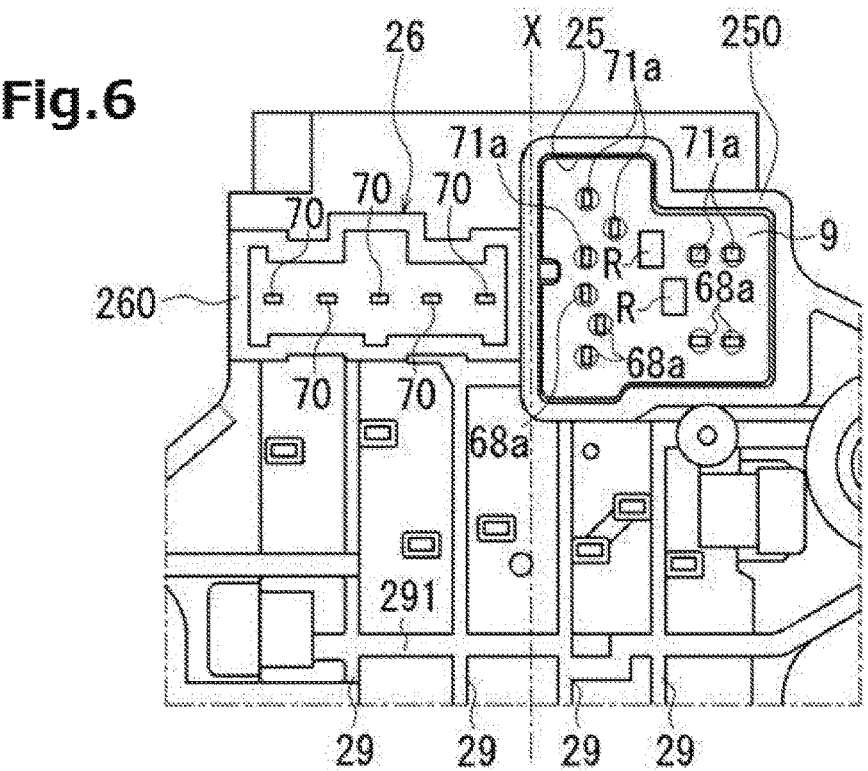
FIG. 6 is a plan view illustrating an essential part of the pole board in an enlarging manner according to the embodiment.

FIG. 5 is a perspective view illustrating the pole board 2, as viewed from the lower side. FIG. 6 is a plan view illustrating the pole board 2, as viewed from the lower side, and is an enlarged drawing illustrating the periphery of an accommodating part 25 in an enlarging manner.

As illustrated in FIG. 4A and FIG. 4B, the fixed contact point 6 has the band-shaped contact points 61, 62, 63, 64, 65 and the rectangular contact point 66.

The band-shaped contact points 61, 62, 63, 64, 65 are disposed in a direction of aligning the longitudinal direction with the axis line X direction, and line up in the direction perpendicular to the axis line X by intervals.

In the present embodiment, the contact points 61, 62, 63, 64, 65 are disposed in the same number as the contact pieces 51 of the movable contact point 5, and correspond to the contact pieces 51 on a one-to-one basis.

The contact pieces 64, 65 are shorter in the length of the axis line X direction than the other contact pieces 61, 62, 63, and a rectangular contact piece 66 is disposed in a position neighbored to the contact pieces 64, 65 in the axis line X direction. This contact piece 66 is connected to the contact piece 61 through a plate-shaped contact piece 67.

In the pole board 2, the contact pieces 61, 62, 63, 64, 65, 66 are formed to be integral with a resin material configuring the pole board 2.

A connecting terminal 68 extends from one end of each of the contact pieces 61, 62, 63, 64, 65 in the axis line X direction.

Tip end parts 68a of the connecting terminals 68 respectively are bent in the direction perpendicular to the axis line X, and are positioned within the accommodating part 25 (refer to FIG. 6) to be described later.

As illustrated in FIG. 2, the accommodating part 25 is opened on one end in the axis line X direction of a backside 20b of the pole board 2 at the opposite side to the cover 4.

The accommodating part 25 is a bottomed hole formed to be recessed in the surface 20a-side of the pole board 2, and is opened downward in the assembling direction of the pole board 2 and the cover 4.

The tip end part 68a of each of the connecting terminals 68 projects from a bottom wall part 251 within the accommodating part 25, and each of the connecting terminals 68 is disposed such that the tip end part 68a is oriented toward the opening direction of the accommodating part 25.

Further, tip end parts 71a of connecting terminals 71 are disposed within the accommodating part 25.

The connecting terminals 71 respectively extend from terminal parts 70 of the output terminal 7, and the tip end parts 71a of the connecting terminals 71 also project from the bottom wall part 251 of the accommodating part 25.

Each of the connecting terminals 71 is disposed such that the tip end part 71a is oriented toward the opening direction of the accommodating part 25. In the accommodating part 25, the tip end part 71a of the connecting terminal 71 is disposed substantially in parallel to the tip end part 68a of the connecting terminal 68 with each other.

As illustrated in FIG. 6, a peripheral wall part 250 surrounding the accommodating part 25 is formed in an opening shape allowing for accommodation of a printed circuit board 9.

Therefore the peripheral wall part 250 is formed in a shape aligned with an outer shape of the printed circuit board 9.

As illustrated in FIG. 2, the printed circuit board 9 is accommodated in the accommodating part 25 in a direction perpendicular to the assembling direction of the pole board 2 and the cover 4 (an upper-lower direction in FIG. 2).

A circuit for disconnection detection is formed on the printed circuit board 9. Connecting holes 91 (refer to FIG. 4B) to the circuit for disconnection detection are disposed on the printed circuit board 9 to penetrate through the printed circuit board 9 in a thickness direction (the assembling direction of the pole board 2 and the cover 4).

In the present embodiment, on inserting the printed circuit board 9 in the accommodating part 25, the tip end part 71a of the connecting terminal 71 and the tip end part 68a of the connecting terminal 68 are configured to penetrate through the connecting holes 91 corresponding thereto.

Therefore when the printed circuit board 9 is arranged within the accommodating part 25, the tip end parts 68a, 71a of the connecting terminals 68, 71 are exposed in the inside of the peripheral wall part 250 and in positions accessible from an exterior (refer to FIG. 6).

Accordingly the tip end parts 68a, 71a of the connecting terminals 68, 71 can be connected to the corresponding circuits of the printed circuit board 9 by soldering.

As illustrated in FIG. 4B, for forming the pole board 2 in the present embodiment, the fixed contact point 6 and the output terminal 7 are once prepared in a state where a region of the fixed contact point 6 other than the tip end part 68a of the connecting terminal 68 and a region of the output terminal 7 other than the tip end part 71a and the terminal part 70 are in advance buried within the common resin member 8.

That is, the fixed contact point 6 and the output terminal 7 are once provided as intermediate components in a state where a positional relation thereof is fixed by the common resin member 8.

When a melted resin material is injected in the metallic mold in which the intermediate components are set to be solidified, the pole board 2 in which the tip end parts 68a of the connecting terminals 68 and the tip end parts 71a of the connecting terminals 71 are arranged in a predetermined position in the accommodating part 25 is formed.

Therefore in the resin molded pole board 2, the tip end parts 68a of the connecting terminals 68 and the tip end parts 71a of the connecting terminals 71 are arranged in the accommodating part 25 with excellent position accuracy.

In the present embodiment, after the tip end part 68a of the connecting terminal 68 and the tip end part 71a of the connecting terminal 71 are connected to the corresponding circuits of the printed circuit board 9 by soldering, an insulating seal material 10 is filled in the accommodating part 25 (refer to a lattice-shaped hatching region in FIG. 2 and FIG. 5).

The seal material 10 is a resin material having insulating properties, and a photo-curable epoxy resin is shown as an example of this resin material.

As described above, the accommodating part 25 is a bottomed hole. In the present embodiment, the pole board 2 is arranged such that the opening of the accommodating part 25 is directed upward in the gravity direction, and thereafter, the fluid seal material 10 is filled in the accommodating part 25, which is irradiated with light of a predetermined wavelength (for example, an ultraviolet light) to cure the seal material 10.

Thereby not only the connecting parts between the printed circuit board 9, and the tip end parts 68a of the connecting terminals 68 and the tip end parts 71a of the connecting terminals 71 within the accommodating part 25 but also all the components positioned within the accommodating part 25 are coated within the cured seal material 10.

In many cases, the inhibitor switch 1 is arranged within a case of an automatic transmission. Operating oil in the case is scooped by a rotating body to act on the inhibitor switch 1 arranged in the case at the working of the automatic transmission. Here, the operating oil of the automatic transmission contains metallic powder and the like, and when the printed circuit board 9 is exposed within the accommodating part 25, there is a possibility that the circuit for disconnection detection is short-circuited by the metallic powder contained in the operating oil to output an inaccurate output signal from the inhibitor switch 1.

As described above, in the present embodiment not only the connecting parts between the printed circuit board 9, and the tip end parts 68a of the connecting terminals 68 and the tip end parts 71a of the connecting terminals 71 within the accommodating part 25 but also all the components positioned within the accommodating part 25 are coated with the cured seal material 10.

Therefore the operating oil acts directly on the printed circuit board 9 to prevent the circuit for disconnection detection from being short-circuited. In this way, an inaccurate output signal is not outputted from the inhibitor switch 1.

It should be noted that the seal material 10 is not limited to the epoxy resin, but may be an insulating resin material having a heat resistance and an oil resistance. Further, the seal material 10 is not limited to the light-curable resin material, but may be a thermosetting resin material.

As illustrated in FIG. 5 and FIG. 6, a connecting part 26 is disposed in the backside 20b of the pole board 2 to be neighbored to the accommodating part 25. The connecting part 26 has a tubular peripheral wall part 260 surrounding the terminal parts 70 of the output terminal 7.

The terminal parts 70 to which the connecting terminals 71 are connected line up by intervals in the direction perpendicular to the axis line X in the inside of the peripheral wall part 260.

As described above, the fixed contact point 6 and the output terminal 7 are provided as the intermediate components in a state where the positional relation is fixed by the common resin member 8 (refer to FIG. 4B). Therefore the terminal parts 70 are also arranged in the inside of the peripheral wall part 260 with excellent position accuracy.

In the present embodiment, the connector part 26 of the inhibitor switch 1 is formed of the terminal parts 70 and the peripheral wall part 260 surrounding the plurality of output terminals. In the connector part 26, a male connector of the harness (unillustrated) extending from a control device (unillustrated) is inserted in a side of the peripheral wall part 260 from the direction of assembling the pole board 2 and the cover 4.

The backside 20b of the pole board 2 is provided with the connector part 26 and the accommodating part 25 at one side in the axis line X direction (at the upper side in FIG. 6). The connector part 26 and the accommodating part 25 line up in the direction perpendicular to the axis line X.

Therefore the connector part 26 and the accommodating part 25 are disposed in the positional relation in which a length of the connecting terminal 71 extending from the terminal part 70 of the output terminal 7 is the shortest.

The backside 20b of the pole board 2 is provided with ribs 29 for reinforcement in positions of substantially overlapping the aforementioned wall parts 202, 203 (refer to FIGS. 3A and 3B). The ribs 29 are disposed along the axis line X. An end part of the rib 29 is connected to the peripheral wall part 250 of the aforementioned accommodating part 25 or the peripheral wall part 260 of the connector part 26.

Further, a reinforcement rib 291 is disposed to connect the ribs 29 with each other neighbored in the direction perpendicular to the axis line X.

Therefore stiffness strength of the pole board 2 is enhanced by the ribs 29 and the reinforcement rib 291 disposed in the backside 20b, the peripheral wall part 250 of the accommodating part 25 and the peripheral wall part 260 of the connector part 26.

Here, an explanation will be made of a circuit configuration of the inhibitor switch 1 as configured above.

Figure 7:
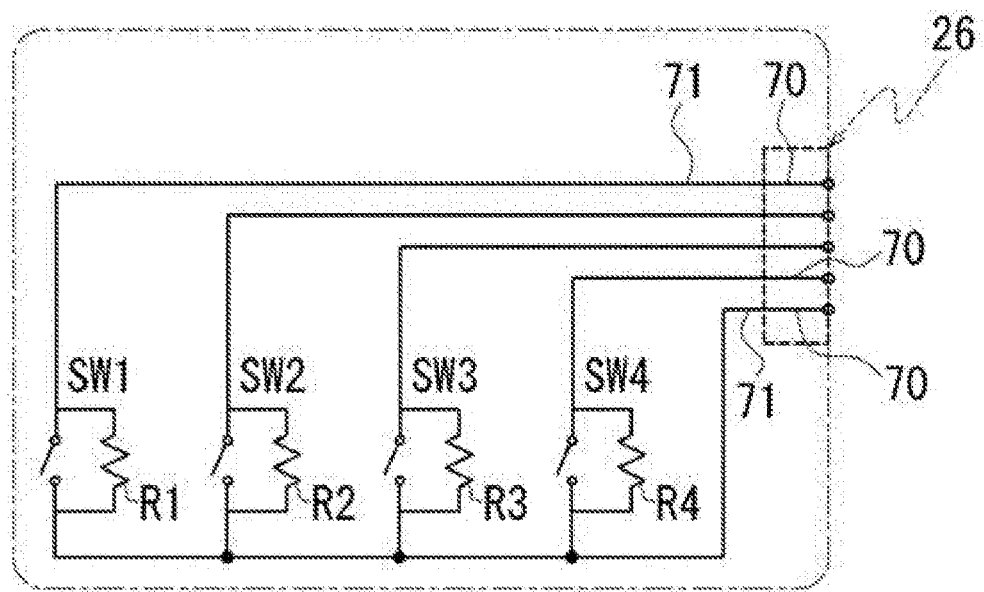
FIG. 7 is a circuit diagram of the inhibitor switch according to the embodiment.

FIG. 7 is a circuit diagram of the inhibitor switch 1.

One of the five terminal parts 70 of the output terminal 7 is a ground terminal. The connecting terminal 71 extending from the terminal part 70 as the ground terminal is connected electrically to the contact piece 61 at the fixed contact point 6-side through a circuit disposed in the printed circuit board 9.

The connecting terminals 71 extending from the four remaining terminal parts 70 are connected electrically to the contact pieces 62, 63, 64, 65 at the fixed contact point 6-side through corresponding circuits disposed in the printed circuit board 9.

In the printed circuit board 9, a resistance R (R1, R2, R3, R4) is disposed in each of circuits connecting the circuit to which the connecting terminal 71 extending from the one terminal part 70 as the ground terminal is connected and the circuits to which the connecting terminals 71 extending from the four remaining terminal parts 70 are connected.

In the inhibitor switch 1, the contact piece 61 and the contact piece 63 at the fixed contact point 6-side, the movable contact point 5 and the resistance R1 configure a switch SW1.

The contact piece 61 and the contact piece 65 at the fixed contact point 6-side, the movable contact point 5 and the resistance R2 configure a switch SW2.

The contact piece 61 and the contact piece 64 at the fixed contact point 6-side, the movable contact point 5 and the resistance R3 configure a switch SW3.

The contact piece 61 and the contact piece 62 at the fixed contact point 6-side, the movable contact point 5 and the resistance R4 configure a switch SW4.

A current value to be outputted from the four remaining terminal parts 70 of the connector part 26 changes with a combination of the contact pieces 62 to 65 to come in contact with the contact piece 61 (ground terminal) at the fixed contact point 6-side through the movable contact point 5 based upon the displacement of the movable board 3 in the axis line X direction.

In the control device (unillustrated) connected through the harness to the connector part 26, the selection range of the shift lever is specified in accordance with the current value outputted from the terminal part 70.

When a failure such as short-circuit or disconnection occurs in the circuit in the inhibitor switch 1, current values outputted from the four remaining terminal parts 70 of the connector part 26 change.

The control device determines presence/absence of the failure based upon the change in the current value in the process in which the shift lever is changed.

As described above, the inhibitor switch 1 according to the present embodiment has the configuration as follows.

(1) The inhibitor switch 1 comprises:

the movable board 3;

the pole board 2 on a surface 20a (inner surface) of which the contact pieces 61, 62, 63, 64, 65, 66 of the fixed contact point 6 are exposed, the surface 20a facing the movable board 3;

the movable contact point 5 that is supported by the movable board 3 and includes the contact pieces 51 making resilient contact with the inner surface of the surface 20a of the pole board 2; and the output terminal 7 including the terminal parts 70 corresponding to the contact pieces 61, 62, 63, 64, 65 of the fixed contact point 6 on a one-to-one basis.

In the inhibitor switch 1, the combination of the contact pieces 61, 62, 63, 64, 65, 66 of the fixed contact point 6 to come in contact with each other through the movable contact point 5 is changed based upon the displacement of the movable board 3 in the axis line X direction.

The fixed contact point 6 and the output terminal 7 are connected through the printed circuit board 9 having the disconnection detection circuit.

The printed circuit board 9 is enclosed in the insulating seal material 10 (resin material).

As configured above, since the printed circuit board 9 having the disconnection detection circuit is disposed in the inhibitor switch 1, the presence/absence of abnormality in the inhibitor switch 1 can be directly confirmed from the output signal of the inhibitor switch 1.

Here, in many cases the inhibitor switch 1 is arranged within the case of the automatic transmission. The operating oil in the case is scooped by the rotating body to act on the inhibitor switch 1 arranged in the case at the working of the automatic transmission. Here, the operating oil of the automatic transmission contains metallic powder and the like, and when the printed circuit board is exposed, there is a possibility that the circuit is short-circuited by the metallic powder contained in the operating oil to output an inaccurate output signal from the inhibitor switch 1.

With the above configuration, since the printed circuit board 9 is enclosed in the insulating seal material 10, the operating oil does not directly act on the printed circuit board 9 to cause the circuit to be short-circuited. Accordingly the inaccurate output signal is not outputted from the inhibitor switch 1.

The inhibitor switch 1 according to the present embodiment has the configuration as follows.

(2) The pole board 2 is provided with the accommodating part 25 of the printed circuit board 9.

The accommodating part 25 includes the bottomed hole that is opened to the backside 20b (outer surface) of the pole board 2.

The printed circuit board 9 is enclosed within the seal material 10 filled in the accommodating part 25.

With this configuration, since the accommodating part 25 is the bottomed hole that is opened to the backside 20b of the pole board 2, it is possible to enclose the printed circuit board 9 within the seal material 10 easily by only injecting the seal material 10 in the accommodating part 25.

Accordingly in a case where the seal material 10 is the insulating resin material that is curable subjected to heat or light, it is possible to enclose the printed circuit board 9 within the seal material 10 easily by only injecting the resin material in the accommodating part and then solidifying it.

The inhibitor switch 1 according to the present embodiment has the configuration as follows.

(3) The tip end part 68a of the connecting terminal 68 (first connecting terminal part) connected to the fixed contact point 6 and the tip end part 71a of the connecting terminal 71 (second connecting terminal part) connected to the output terminal 7 are disposed along the opening direction of the accommodating part 25 (the assembling direction of the pole board 2 and the cover 4) in the inside of the accommodating part 25.

The accommodating part 25 is, as viewed in the opening direction, sized to be capable of installing the printed circuit board 9 therein from the opening direction.

The printed circuit board 9 is provided with the connecting holes 91 to the disconnection detection circuit.

The connecting holes 91 penetrate through the printed circuit board 9 in the opening direction (thickness direction) in a state where the printed circuit board 9 is installed within the accommodating part 25.

With this configuration, by disposing the connecting holes 91 in the positions corresponding to the tip end part 68a of the connecting terminal 68 and the tip end part 71a of the connecting terminal 71, the tip end part 68a of the connecting terminal 68 and the tip end part 71a of the connecting terminal 71 can be inserted in the corresponding connecting holes 91 respectively at the time of installing the printed circuit board 9 within the accommodating part 25.

Then, the tip end part 68a of the connecting terminal 68 and the tip end part 71a of the connecting terminal 71 having penetrated through the connecting holes 91 can be soldered to the printed circuit board 9 from the opening side of the accommodating part 25. Accordingly it is possible to easily perform the connection between the tip end part 68a of the connecting terminal 68 and the tip end part 71a of the connecting terminal 71, and the corresponding circuits of the printed circuit board 9.

The inhibitor switch 1 according to the present embodiment has the configuration as follows.

(4) The connecting terminals 68, and the terminal parts 70 and the connecting terminals 71 of the output terminal 7 are supported by the common resin member 8 to fix the positional relation therebetween.

The connecting terminals 68, and the terminal parts 70 and the connecting terminals 71 of the output terminal 7 are buried in the pole board 2 together with the common resin member 8.

With this configuration, at least the tip end part 68a of the connecting terminal 68 and the tip end part 71a of the connecting terminal 71 can be arranged in a desired positional relation with good accuracy. Thereby the tip end part 68a of the connecting terminal 68 and the tip end part 71a of the connecting terminal 71 can be appropriately inserted in the corresponding connecting holes 91 respectively at the time of installing the printed circuit board 9 within the accommodating part 25.

In addition, since the common resin member 8 is buried in the pole board 2, in a state where the positional relation between the connecting terminals 68, and the terminal parts 70 and the connecting terminals 71 of the output terminal 7 is held at the time of resin-molding the pole board 2, the connecting terminals 68, and the terminal parts 70 and the connecting terminals 71 of the output terminal 7 can be formed to be integral with the pole board 2.

Here, since the connecting terminals 68 are respectively connected to the contact pieces 61, 62, 63, 64, 65 of the fixed contact point 6, in the resin-molded pole board 2 the contact pieces 61, 62, 63, 64, 65 of the fixed contact point 6, the connecting terminals 68, and the terminal parts 70 and the connecting terminals 71 of the output terminal 7 can be disposed with good accuracy.

The inhibitor switch 1 according to the present embodiment has the configuration as follows.

(5) The movable board 3 is movable back and forth in the axis line X direction along the longitudinal direction of the contact pieces 61, 62, 63, 64, 65 of the fixed contact point 6.

In the pole board 2 the contact pieces 61, 62, 63, 64, 65 are disposed to be spaced in the direction perpendicular to the axis line X direction.

The accommodating part 25 is disposed to be neighbored to one ends of the contact pieces 61, 62, 63, 64, 65 in the longitudinal direction.

With this configuration, a length of each of the contact pieces 61, 62, 63, 64, 65 and the connecting terminal 68 corresponding to each of the contact pieces 61, 62, 63, 64, 65 can be made to the shortest distance. Thereby it is possible to appropriately prevent the pole board 2 from growing in size.

The inhibitor switch 1 according to the present embodiment has the configuration as follows.

(6) The terminal parts 70 of the output terminal 7 line up to be spaced in the direction perpendicular to the axis line X direction.

The pole board 2 is provided with the peripheral wall part 260 surrounding the plurality of terminal parts 70 to direct the opening of the peripheral wall part 260 in the same direction as the opening direction of the accommodating part 25.

The connector part 26 is configured of the plurality of terminal parts 70 and the peripheral wall part 260.

In the pole board 2 the peripheral wall part 250 of the accommodating part 25 and the peripheral wall part 260 of the connector part 26 line up in the direction perpendicular to the axis line X direction.

With this configuration, a length of the connecting terminal 71 corresponding to each of the terminal parts 70 of the output terminal 7 can be made to the shortest distance. Thereby it is possible to appropriately prevent the pole board 2 from being perpendicular to the axis line direction.

Further, when the peripheral wall part 250 of the accommodating part 25 and the peripheral wall part 260 of the connector part 26 line up in the direction perpendicular to the axis line X direction, it is possible to appropriately prevent the pole board 2 from growing in size in the axis line X direction.

Thereby it is possible to prevent the entire pole board 2 from growing in size.

The inhibitor switch 1 according to the present embodiment has the configuration as follows.

(7) The opening direction of the accommodating part 25 is the assembling direction of the cover 4 and the pole board 2.

With this configuration, the peripheral wall part 250 of the accommodating part 25 and the peripheral wall part 260 of the connector part 26 can be accommodated within a range of the pole board 2 as viewed in the assembling direction.

The existing inhibitor switch is provided with the peripheral wall part 260 surrounding the output terminal 7. Therefore since the accommodating part 25 can be disposed by using a height of the peripheral wall part 260 in the assembling direction, disposing the accommodating part 25 can appropriately prevent a thickness of the inhibitor switch 1 in the assembling direction from being thicker than that of the existing inhibitor switch.

The inhibitor switch 1 of the aforementioned embodiment shows a case where the movable board 3 moves back and forth in the axis line X direction in association with an operation of the shift lever, as an example.

The present invention is applicable to an inhibitor switch in which the movable board is disposed to be movable about the axis line perpendicular to an inner surface of the pole board facing the movable board.

In addition, the aforementioned embodiment shows a case where the printed circuit board is disposed in the inside of the inhibitor switch, as an example, but the present invention is not limited to this aspect.

For example, the connector part may be disposed separately from a main body of the inhibitor switch.

In this case, wires may be disposed to connect the respective contact pieces of the fixed contact point 6 and the terminal parts of the connector part, and the wires connected to the respective contact pieces of the fixed contact point 6 may be connected through the printed circuit board to the terminal parts of the connector part in a position away from the inhibitor switch 1.

In this case, a case for accommodating the printed circuit board is prepared, and the wires connected to the respective contact pieces of the fixed contact point 6 and the terminal parts of the connector part may be connected to the printed circuit board within the case to seal the case with an insulating seal material.

With adoption of this configuration, effects similar to those in the aforementioned case can be achieved.

While only the selected embodiment and modifications have been chosen to illustrate the present invention, it will be apparent to those skilled in the art from this disclosure that various changes and modifications can be made therein without departing from the scope of the invention as defined in the appended claims. Furthermore, the foregoing descriptions of the embodiment and the modifications according to the present invention are provided for illustration only, and not for the purpose of limiting the invention as defined by the appended claims and their equivalents.

What is claimed is:

1. A switch comprising:
a movable board;
a pole board having an inner surface on which a fixed contact point is exposed, the inner surface facing the movable board;
a movable contact point supported by the movable board and including a plurality of contact pieces making resilient contact with the inner surface of the pole board; and
an output terminal corresponding to the fixed contact point;
wherein the movable contact point and the fixed contact point come in contact with each other when a position of the movable contact point is changed via a displacement of the movable board;
wherein the fixed contact point and the output terminal are connected via a board having a disconnection detection circuit;
wherein the disconnection detection circuit is configured to detect a failure including at least one of a disconnection and a short-circuit in a circuit of the switch in connection with a control device that determines presence/absence of an abnormality of the switch based on an output signal outputted from the switch; and
wherein the board is enclosed in an insulating seal material.

2. The switch according to claim 1, wherein:
the pole board includes an accommodating part configured to receive the board;
the accommodating part includes a bottomed hole opening to an outer surface of the pole board; and
the insulating seal material is disposed in the accommodating part and completely surrounds the board.

3. The switch according to claim 2, further comprising:
a first connecting terminal part connected to the fixed contact point; and
a second connecting terminal part connected to the output terminal, the first connecting terminal part and the second connecting terminal part disposed along an opening direction of the accommodating part and inside of the accommodating part;
wherein the accommodating part is, as viewed in the opening direction, structured such that the board is installable from the opening direction;
wherein the board includes a connecting hole extending to the disconnection detection circuit; and
wherein the connecting hole penetrates through the board in the opening direction when in a state where the board is installed within the accommodating part.

4. The switch according to claim 3, wherein:
the first connecting terminal part, the output terminal, and the second connecting terminal part are supported by a common resin member fixing a positional relation therebetween; and
the first connecting terminal part, the output terminal, and the second connecting terminal part are buried in the pole board together with the common resin member.

5. The switch according to claim 2, wherein:
the movable board is movable back and forth in an axis line direction extending along a longitudinal direction of the fixed contact point;
the fixed contact point includes a plurality of fixed contact points that are disposed spaced apart in a direction perpendicular to the axis line direction; and
the accommodating part is disposed in a position adjacent to an end of the fixed contact point in the longitudinal direction.

6. The switch according to claim 5, wherein:
the output terminal includes a plurality of output terminals disposed spaced apart in the direction perpendicular to the axis line direction;
the pole board includes a peripheral wall part surrounding the plurality of output terminals and protruding from the pole board in an opening direction of the accommodating part such that an opening of the peripheral wall part in the opening direction of the accommodating part is defined; and the accommodating part and the peripheral wall part are disposed adjacent to one another in the direction perpendicular to the axis line direction.

7. The switch according to claim 6, wherein the opening direction of the accommodating part defines an assembling direction of the movable board and the pole board.

8. A switch, comprising:
a movable board;
a pole board having an inner surface facing the movable board on which a fixed contact point is exposed, the pole board including an accommodating part configured as a recess disposed in an outer surface of the pole board facing away from the movable board;
a circuit board arranged within the accommodating part;
an insulating seal material disposed in the accommodating part and enclosing the circuit board;
a movable contact point coupled to the movable board and including a plurality of contact pieces making resilient contact with the inner surface of the pole board;
an output terminal electrically connected to the fixed contact point via a disconnection detection circuit of the circuit board;
wherein different combinations of the plurality of contact pieces of the movable contact point are adjustable into contact with the fixed contact point via displacement of the movable board;
wherein an output signal provided by the output terminal varies based on the combination of the plurality of contact pieces in contact with the fixed contact point; and
wherein the disconnection detection circuit is configured such that the output signal is changed when at least one of an abnormality and a failure occurs in the disconnection detection circuit and, based on the change in the output signal, the at least one of the abnormality and the failure is detectable via a control device.

9. The switch according to claim 8, wherein the seal material completely fills the accommodating part and surrounds the circuit board.

10. The switch according to claim 8, wherein the circuit board includes a plurality of connecting holes disposed in a surface of the circuit board facing the outer surface of the pole board and extending into the circuit board to the disconnection detection circuit.

11. The switch according to claim 8, wherein:
the movable board is adjustable along an axis;
the fixed contact point includes a plurality of fixed contact pieces disposed spaced apart from one another in a direction extending perpendicular to the axis; and
the plurality of contact pieces are respectively disposed in alignment with an associated one of the plurality of fixed contact pieces and extend away from the movable board toward the pole board.

12. The switch according to claim 8, wherein:
the pole board includes a peripheral wall protruding from the outer surface of the pole board, the peripheral wall defining a connector part configured to receive at least a portion of a harness; and
the output terminal includes a plurality of output terminal parts projecting into an interior of the connector part and disposed spaced apart from one another.

13. The switch according to claim 10, wherein:
the fixed contact point includes a first connecting terminal part protruding therefrom towards the circuit board;

the output terminal includes a second connecting terminal part protruding therefrom towards the circuit board; and the first connecting terminal part and the second connecting terminal part are disposed within the plurality of connecting holes and coupled to the disconnection detection circuit.

14. The switch according to claim 13, wherein the first connecting terminal part, the output terminal, and the second connecting terminal part are at least partially embedded within a common resin member.

15. A switch, comprising:
a movable board;
a pole board having an inner surface facing the movable board and an outer surface facing away from the movable board, the pole board including an accommodating part structured as a recess disposed in the outer surface of the pole board;
a circuit board arranged within the accommodating part;
an insulating seal material disposed in the accommodating part and enclosing the circuit board;
a fixed contact point disposed on the inner surface of the pole board;
a movable contact point coupled to the movable board and including a plurality of contact pieces making resilient contact with the inner surface of the pole board;
an output terminal electrically connected to the fixed contact point via a disconnection detection circuit of the circuit board;
wherein different combinations of the plurality of contact pieces of the movable contact point are adjustable into contact with the fixed contact point via displacement of the movable board;
wherein an output current provided by the output terminal varies based on the combination of the plurality of contact pieces in contact with the fixed contact point; and
wherein the disconnection detection circuit is configured such that the output current is changed when at least one of an abnormality and a failure occurs in the disconnection detection circuit and, based on the change in the output current, the at least one of the abnormality and the failure is detectable via a control device.

16. The switch according to claim 15, wherein:
the fixed contact point includes a plurality of fixed connecting terminals;
the output terminal includes a plurality of output connecting terminals;
the disconnection detection circuit includes a plurality of circuits and a ground circuit;
each of the plurality of output connecting terminals is connected to an associated fixed connecting terminal of the plurality of fixed connecting terminals;
one of the plurality of output connecting terminals is configured as a ground terminal and connected to the associated fixed connecting terminal via the ground circuit;
a remainder of the plurality of output connecting terminals are respectively connected to the associated fixed connecting terminal via a respective circuit of the plurality of circuits; and each of the plurality of circuits is connected to the ground circuit via a resistor.

17. The switch according to claim 15, wherein:

the pole board includes a plurality of walls projecting from the inner surface of the pole board and disposed spaced apart from one another;

the plurality of walls define a plurality of spaces, each of the plurality of spaces defined between adjacent walls of the plurality of walls; and the fixed contact point includes a plurality of fixed contact pieces respectively disposed in one of the plurality of spaces.

18. The switch according to claim 17, wherein the plurality of contact pieces are respectively disposed in alignment with an associated fixed contact piece of the plurality of fixed contact pieces and project into a corresponding space of the plurality of spaces in which the associated fixed contact piece is disposed.

19. The switch according to claim 18, wherein:

the movable board is adjustable along an axis; and the plurality of contact pieces, the plurality of fixed contact pieces, and the plurality of walls each have a longitudinal extent disposed parallel to the axis.

20. The switch according to claim 19, wherein:

the fixed contact point includes a plurality of fixed contact pieces disposed spaced apart from one another, each of the plurality of fixed contact pieces including one of the plurality of fixed connecting terminals;

the plurality of contact pieces are respectively disposed in alignment with an associated fixed contact piece of the plurality of fixed contact pieces and are adjustable into contact with the associated fixed contact piece via displacement of the movable board; and when in contact with the associated fixed contact piece, the plurality of contact pieces respectively connect the respective circuit of the associated fixed contact piece to the ground circuit.

* * * * *